(12) United States Patent
Mouskis (10) Patent No.: US 8,366,048 B2
(45) Date of Patent: Feb. 5, 2013

(54) AERIAL REFUELLING APPARATUS (75) Inventor: Christopher Mouskis, Wimborne (GB)

(73) Assignee: Flight Refuelling Limited, Dorset (GB)

( * ) Notice: Subject to any disclaimer, the term of this patent is extended or adjusted under 35 U.S.C. 154(b) by 80 days.

(21) Appl. No.: 12/662,475

(22) Filed: Apr. 19, 2010

(65) Prior Publication Data

US 2010/0270431 A1 Oct. 28, 2010

(30) Foreign Application Priority Data

Apr. 20, 2009 (GB) .................................. 0906774.5

(51) Int. Cl.
*B64D 39/00* (2006.01)
(52) U.S. Cl. .................. 244/135 A; 244/1 TD
(58) Field of Classification Search .............. 244/135 A, 244/1 TD, 135 R
See application file for complete search history.

(56) References Cited

U.S. PATENT DOCUMENTS

| 2,949,265 | A | * | 8/1960 | Person | 244/135 A |
| 3,091,419 | A | * | 5/1963 | Mosher | 244/135 A |
| 2006/0102791 | A1 | | 5/2006 | Adelson | |
| 2006/0214059 | A1 | * | 9/2006 | Smith | 244/135 A |

OTHER PUBLICATIONS

Search Report for United Kingdom Application No. GB0906774.5 dated Aug. 17, 2009 (1 page).

* cited by examiner

*Primary Examiner* — Timothy D Collins
*Assistant Examiner* — Brian M O'Hara
(74) *Attorney, Agent, or Firm* — Finnegan, Henderson, Farabow, Garrett & Dunner, L.L.P.

(57) ABSTRACT

An adaptor for mounting a refuelling hose and drogue arrangement to a refuelling boom of an aircraft is arranged to provide fluid communication between the boom and a hose of the hose and drogue arrangement. The adaptor is also arranged such that the hose is movable with respect to the boom. The adaptor includes an actuator arranged to produce a biasing force on the hose, and arranged for affecting movement to adjust the position of the hose in relation to the boom.

17 Claims, 10 Drawing Sheets

AERIAL REFUELLING APPARATUS

CROSS-REFERENCE TO RELATED APPLICATIONS

This application claims the priority of United Kingdom Application No. 0906774.5, filed Apr. 20, 2009, which is incorporated herein by reference.

TECHNICAL FIELD

The present invention relates to aerial refuelling apparatus, and in particular to a refuelling apparatus for allowing selective refuelling either by means of a boom, or by means of a hose and drogue arrangement.

BACKGROUND

In previous arrangements for allowing hose and drogue refuelling from a tanker aircraft which is fitted with a refuelling boom, it has been possible to attach an adaptor to the boom, which has a hose and drogue attached thereto. Such an adaptor is known as a boom drogue adaptor. The adaptor provides fluid communication between the boom and the hose. However, the adaptor and hose/drogue can only be fitted when the aircraft is on the ground, such that the tanker aircraft must be configured either for boom refuelling or for hose and drogue refuelling during any particular flight.

In addition, in hose and drogue refuelling, upon engagement with the receiving aircraft, the hose develops slack as the receiver pushes the drogue towards the end of the hose which is attached to the boom, such that great care is required from the receiver aircraft to avoid excessive slack allowing the hose to whip in the air flow. This is frequently the cause of accidents.

In order to allow a change in configuration during flight, it has been proposed to mount a hose and drogue, attached to an adaptor, on the aircraft tail. Such an arrangement is shown in US 2006/0102791. A boom is provided which is movable during flight from a deployed position extending away from the aircraft where it can be used directly for refuelling, to a stowed position adjacent the aircraft in which it can be attached to the adaptor in the aircraft tail. In this position the hose and drogue communicates with the boom. The boom can then be extended away from the aircraft with the hose and drogue attached, which can be used for refuelling.

However this system has some shortcomings. Since the hose and drogue are mounted in the aircraft tail, the hose must be relatively short in order to provide sufficient ground clearance upon the aircraft taking off and landing. This leads to a lack of hose response such that high loads may be imparted to refuelling probes, and also to a smaller movement envelope for the receiver aircraft. Furthermore landings are made more difficult for the tanker aircraft because of the trailing hose. Also the problem of hose slack being created as the receiver makes contact is not addressed.

The present invention aims to address these problems.

SUMMARY

According to the present invention there is provided an adaptor for mounting a refuelling hose and drogue arrangement to a refuelling boom of an aircraft, the adaptor being arranged to provide fluid communication between the boom and the hose, and being arranged such that the hose is movable with respect to the boom, the adaptor comprising an actuator arranged to produce a biasing force on the hose, for affecting movement of the hose in relation to the boom.

With this arrangement, the adaptor may be actuated effectively to retract the hose to take up any slack in the hose when the receiver aircraft makes contact with the drogue. Furthermore, the adaptor may be actuated to move the hose to a position above the boom. Thus the hose may be longer, since the proximal end can be moved away from the ground during takeoff or landing of the aircraft.

For example, the adaptor may be actuatable to produce a biasing force on the hose arranged to be in a direction to counter the aerodynamic force on the hose and drogue in flight; that is in a direction generally towards the proximal end of the boom. Thus the biasing force may cause movement of the hose so as to take up any slack in the hose, particularly on contact with the receiver aircraft probe. The biasing force may conveniently be variable.

Preferably the adaptor is arranged to be attached to the boom at or adjacent the distal end thereof. It may comprise an arm with a fuel channel, which is pivotally mounted at one end to the boom, and at the other end to the hose. The pivot axis is preferably perpendicular to the boom. In this example, the channel is in fluid communication with the boom and the hose, and the biasing force may be torque applied at the pivotal mount. For example the actuator may comprise a motor for applying torque at the pivotal mounting between the arm and the boom, to move the arm about the pivot.

The invention also provides a refuelling apparatus for an aircraft comprising a boom, and an adaptor as claimed in any preceding claim for attaching the boom to a hose and drogue arrangement. The apparatus may also comprise a control system arranged to control the actuator.

BRIEF DESCRIPTION OF THE DRAWINGS

In order that the invention may be more readily understood, reference will now be made to the accompanying drawings, in which.

DETAILED DESCRIPTION

Figure 1:
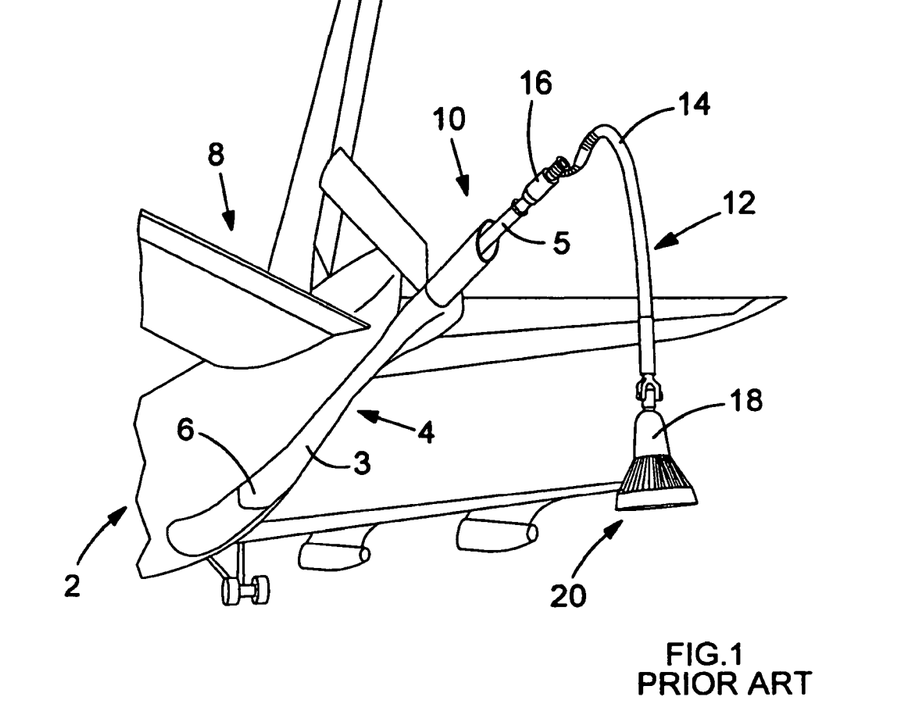
FIG. 1 is a perspective view of a boom drogue adaptor in use according to the prior art.

Referring to FIG. 1, an aircraft 2 has a refuelling boom 4 for supplying fuel therethrough. The boom 4 is telescopic, with an outer tube 3 and an inner tube 5. The proximal end 6 of the boom 4 is attached to the underneath of the aircraft fuselage adjacent the tail 8, such that it has a stowed position lying against the underneath of the fuselage, with the distal end 10 extending just beyond the end of the aircraft tail 8. In use for boom refuelling, the boom 4 may be deployed downwardly to extend away from the aircraft, such that the distal end 10 of the boom may be guided onto the receiver aircraft receptacle or probe, so that the aircraft can receive fuel.

When it is required that the tanker aircraft 2 should supply fuel using a hose and drogue arrangement 12, the hose 14 must be fitted to the distal end 10 of the boom 4 by an operative on the ground. An adaptor 16 is normally used for this purpose. Fuel may then be supplied via the boom 4 through the adaptor 16 into the hose 14, and the receiver aircraft probe may be inserted into a reception coupling 18 of a drogue 20 at the distal end of the hose 14 to receive fuel.

It can be seen from FIG. 1 that the hose 14 with this arrangement must be relatively short, so as to give sufficient ground clearance when the tanker aircraft 2 is taking off or landing. Also this arrangement does not provide for hose response upon receiver engagement, which can result in hose whip, and in addition it is necessary for the hose and drogue arrangement 12 to be attached or detached when the aircraft is on the ground.

Figure 2:
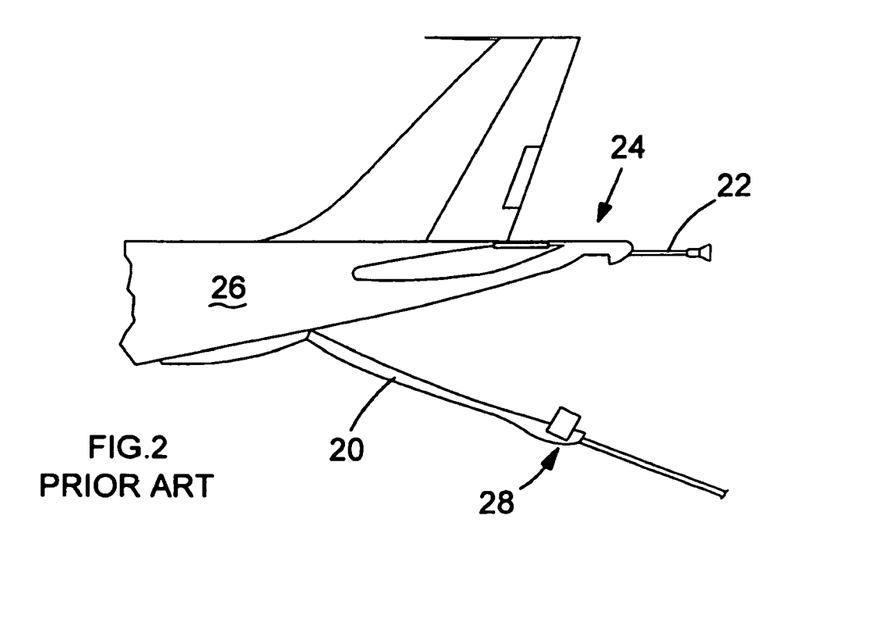
FIG. 2 is a schematic side view of a further boom drogue adaptor according, to the prior art.

An alternative to this arrangement is proposed in US 2006/0102791, and illustrated in FIG. 2. With this arrangement the boom 20 is deployable from the aircraft in a similar manner to that shown in FIG. 1. However, in this case the hose and drogue arrangement 22 is mounted to the tail 24 of the aircraft 26. Thus when the boom 20 is retracted, the distal end 28 of the boom 20 may dock with an adaptor within a tail of the aircraft (not shown), such that it is connected to the hose and drogue 22. Refuelling may then take place via the hose and drogue 22 when the boom 20 is deployed. However it can be seen from FIG. 2 that the hose and drogue arrangement 22 of this system must still be relatively short to allow sufficient ground clearance on take off and landing, and still does not provide for hose response.

Figure 3:
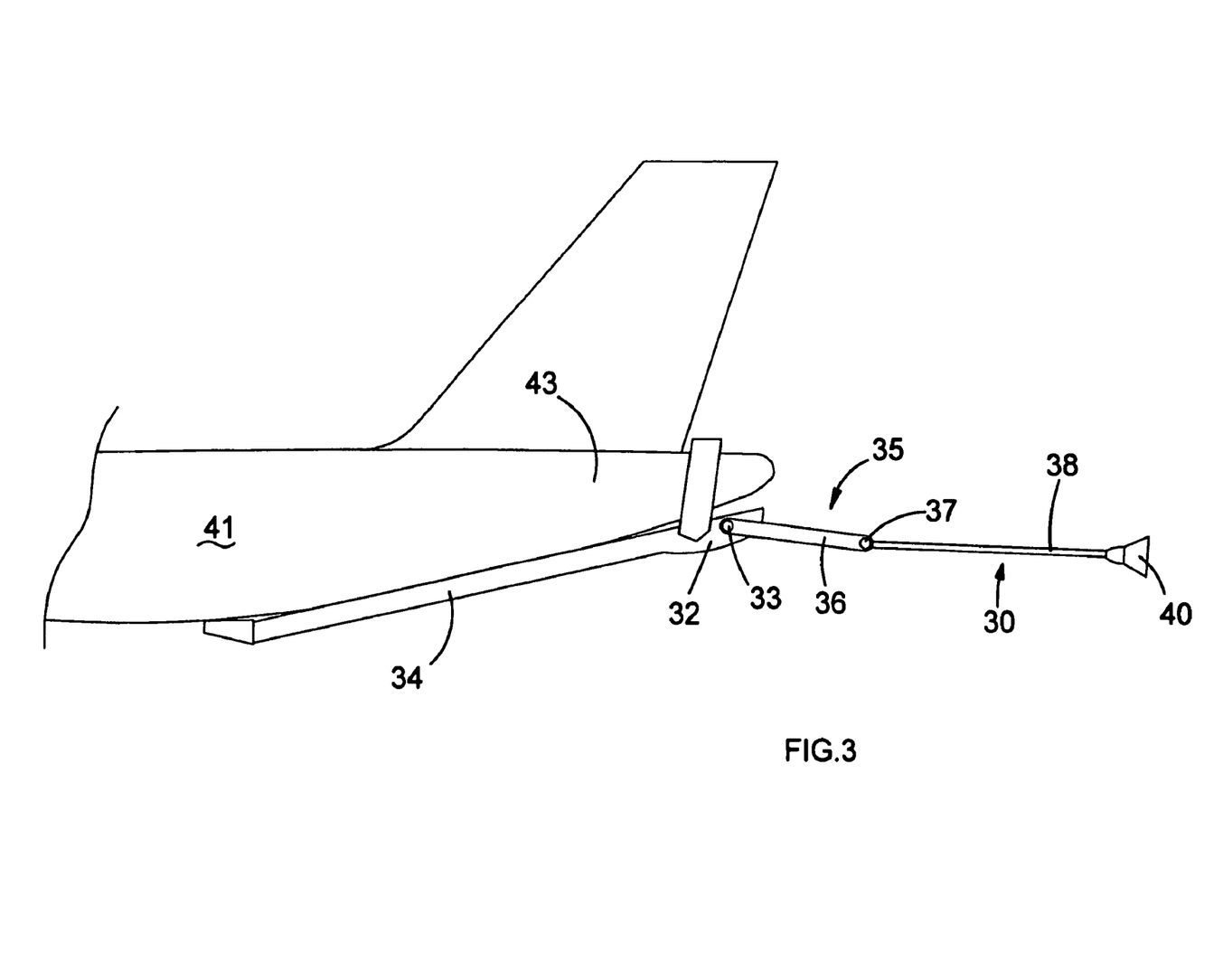
FIG. 3 is a schematic side view of a boom drogue adaptor according to an embodiment of the invention, showing a position during flight.

Referring now to FIG. 3, in one embodiment of the present invention, the hose and drogue arrangement 30 is connected to the distal end 32 of a boom 34 by means of a boom drogue adaptor 35 providing a linkage in the form of an arm 36.

The linkage arm 36 comprises a rigid elongate member which is pivotally attached at one end 33 to the distal end of the boom 32, and at the other end 37 to a hose 38 of the hose and drogue arrangement 30. An actuator, described in more detail below, is provided at the one end 33 to apply a biasing force or torque at the pivotal mount. It can be seen from FIG. 3 that, when the aircraft is in flight, the boom 34 is stowed against the underside of the aircraft. The hose and drogue arrangement 30 may then be allowed to trail directly behind the aircraft, or the actuator may lock the arm 36 is a suitable position.

Figure 8:
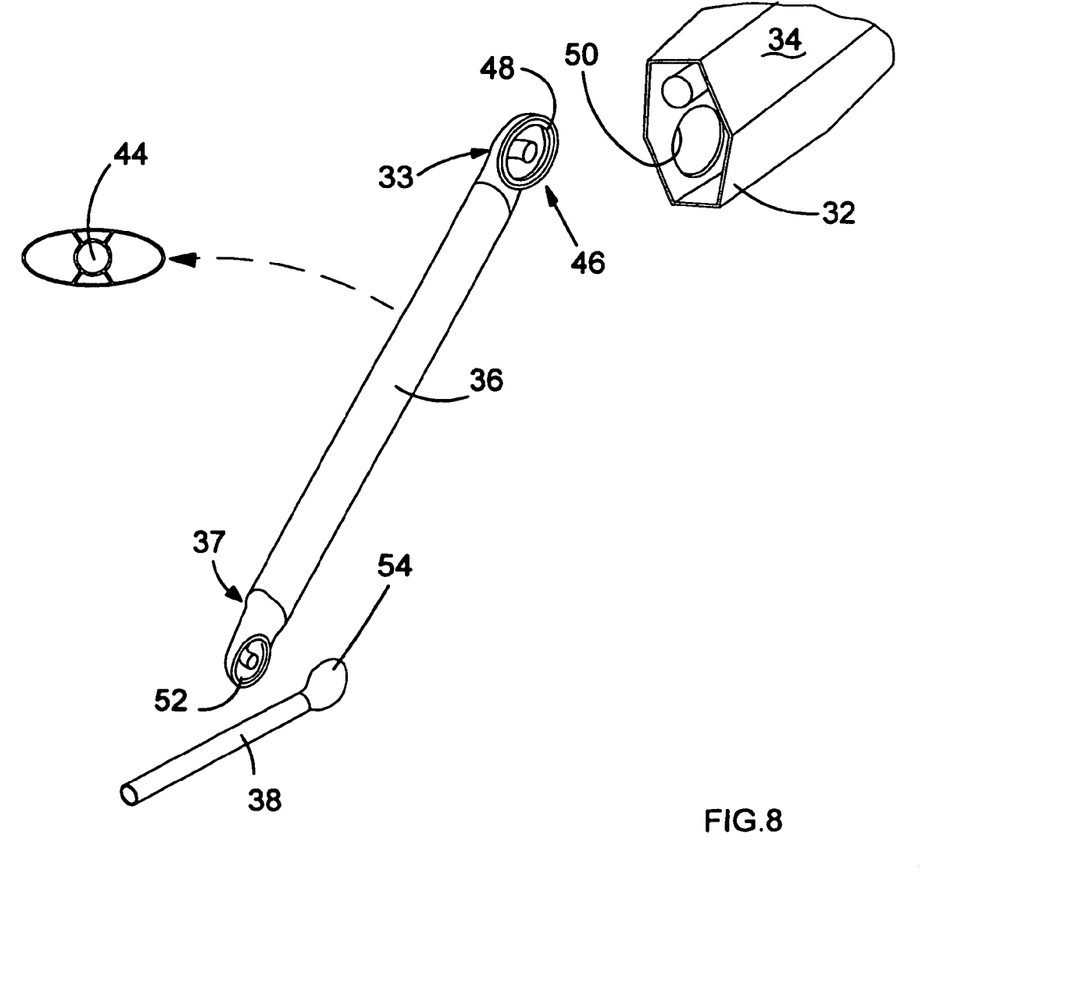
FIG. 8 is a schematic exploded perspective view showing the adaptor shown in FIGS. 3 to 7, FIGS. 9, 10 and 11 are schematic cross-sectional views of the attachment between the boom and the adaptor.

As can be seen from FIG. 8, the arm 36 comprises an elongate tube, for example having an oval cross-section with a fluid channel 44 extending along the inside thereof. At the proximal end 46 of the arm 36 a first bearing 48 is provided for mounting in an aperture 50 at the distal end 32 of the boom 34. A similar second bearing 52 is provided at the distal end 37 of the arm 36 for attachment to the proximal end 54 of the hose 38. The first and second bearings 48,52 allow pivotal movement between the boom and arm, and the arm and hose respectively.

Figure 9:
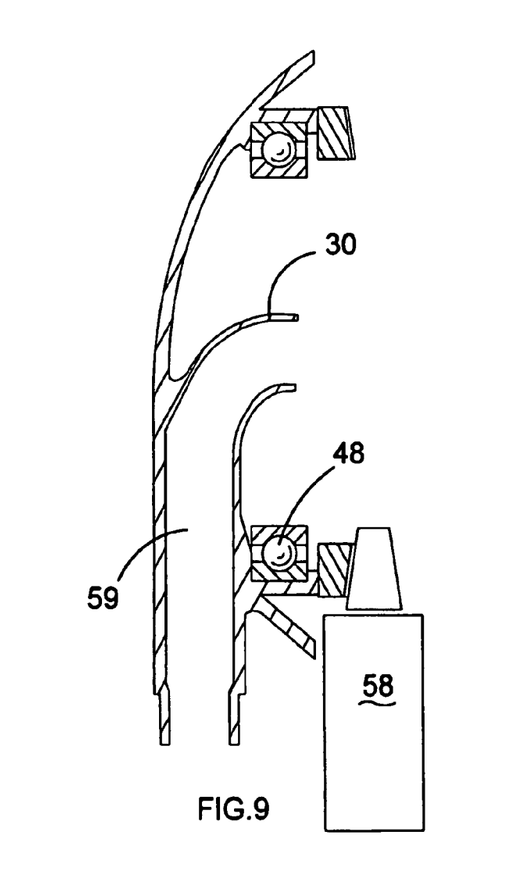
Figure 10:
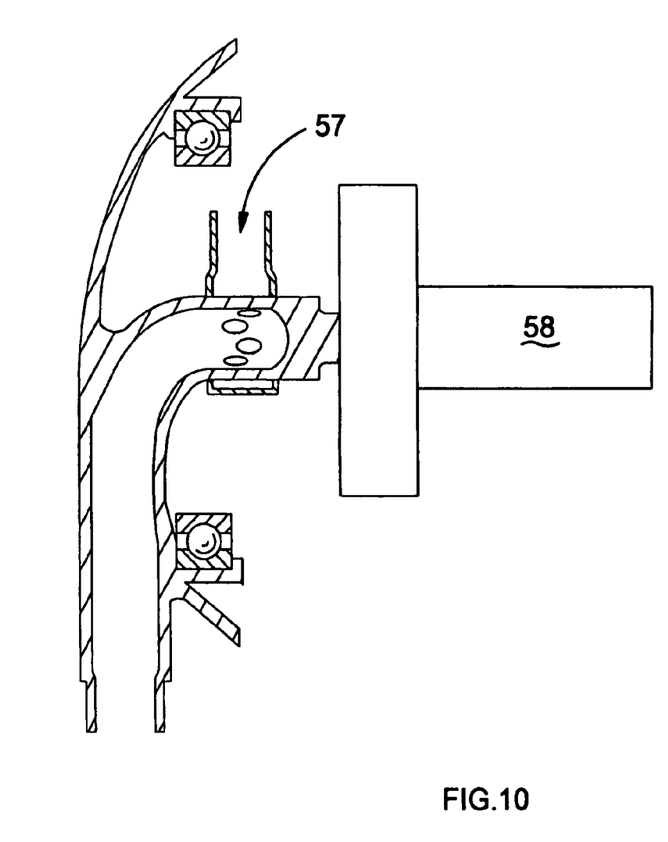
Figure 11:
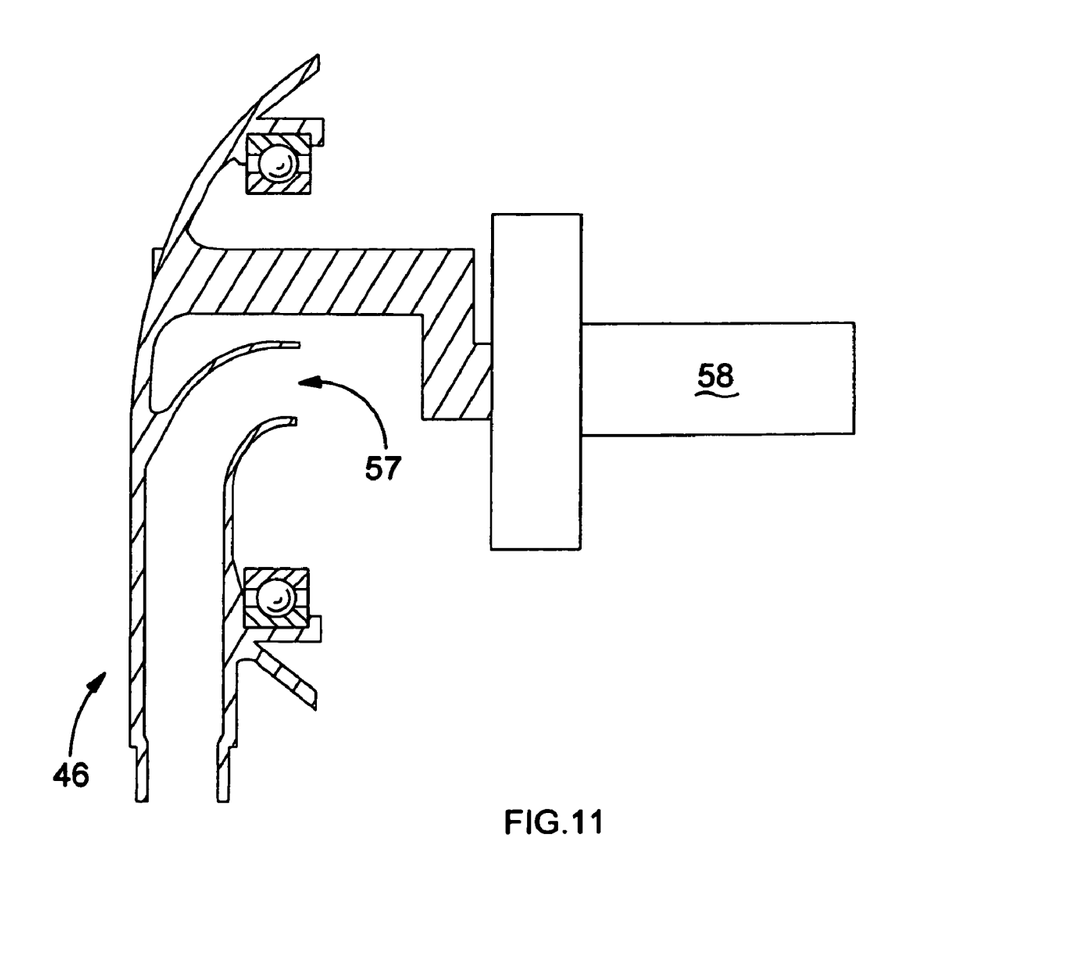

Referring also to FIGS. 9, 10 and 11, in each case the proximal end 46 of the arm 36 is shown together with a motor and gearbox arrangement 58 to actuate the arm 36 by applying torque. It can be seen that a fuel pipe 59 extends along the arm to cooperate with a fuel inlet, e.g. 57 in FIG. 10. In each case, the motor and gearbox arrangement 58 may be operated to apply a force to turn the arm 36 about the bearing 48 with respect to the aperture 50 in the boom 34.

Figure 12:
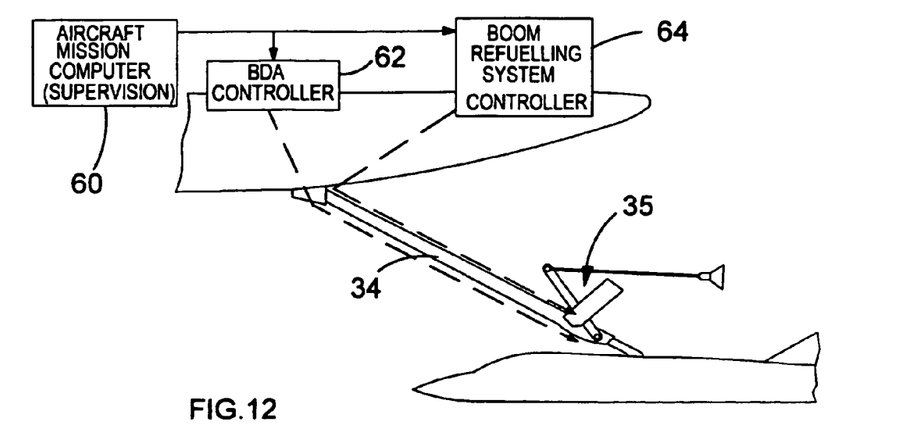
FIGS. 12 and 13 show the control system for operation of the boom and the boom drogue adaptor for boom refuelling and for hose and drogue refueling respectively.

FIG. 12 shows an operating system for the adaptor within the aircraft. An aircraft mission computer 60 is in communication with a boom drogue adaptor controller 62, and a boom refuelling system controller 64. The adaptor controller 62 is operatively connected to the motor and gearbox arrangement 58 for actuating the arm 36. The boom controller 64 is operatively connected to the boom for positioning the boom.

Figure 4:
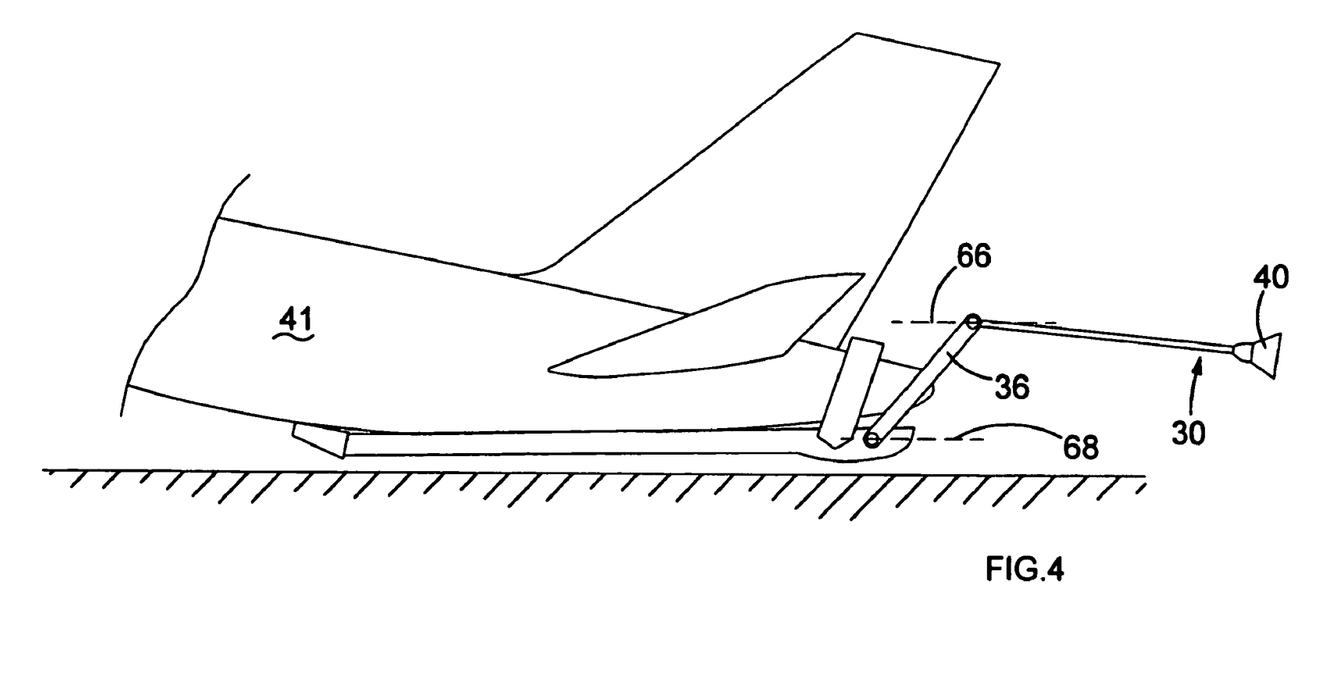
FIG. 4 is a schematic side view of the boom drogue adaptor of FIG. 3 showing the configuration during take off and landing.

Referring now to FIG. 4, when a configuration for take off or landing is required, the computer 60 may instruct the boom controller 62 to actuate the arm 36, by operation of the motor 58, to pivot the arm upwardly about the first bearing 48.

Thus, the arm 36 moves towards a vertical position, raising the trail axis 66 of the hose 38 above the axis 68 of the boom 34. The controller 62 may then lock the motor in position. This configuration is suitable for take off or landing, as it raises the hose and drogue arrangement 30 away from the ground.

Figure 5:
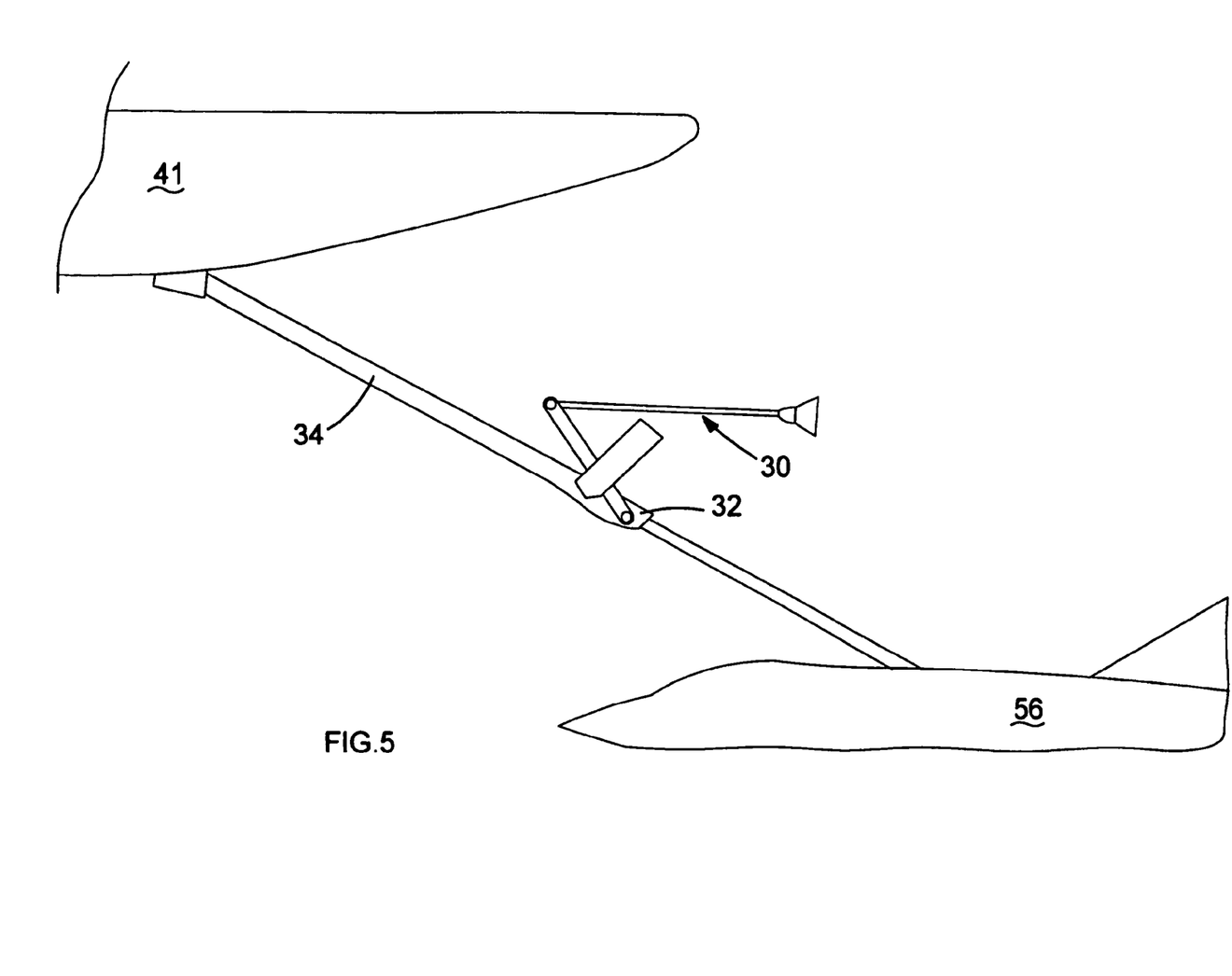
FIG. 5 is a schematic side view of the boom drogue adaptor of FIG. 3 showing a configuration during boom refuelling.

As shown in FIGS. 5 and 12, for boom refuelling, the computer 60 instructs the boom controller 64 to position the boom 34 for refuelling. The adaptor controller 62 actuates the motor 58 to rotate the arm 36 further about the first bearing 48 in the anticlockwise direction, moving the hose to a stowed position, and locking it there. Thus in flight the hose and drogue 30 are located above the boom 34 and clear of the distal end 32 thereafter so as to allow an aircraft 56 which is to be refuelled to use the boom 34 for refuelling.

Alternatively, should the aircraft 56 require hose and drogue refuelling, the mission computer 60 instructs the boom controller 64 to hold boom position. The adaptor controller 62 is instructed to move to refuel, in which condition it operates autonomously. Thus, the adaptor controller 62 uses data from the boom drogue adaptor 35 to calculate the required torque and instruct the actuator to apply torque. In the refuelling position, the bearing 48 is rotated in a clockwise direction such that the arm 36 extends below the boom 34 (see FIGS. 6 and 13). In this position, a straight hose end path may be provided, and further clearance between the tanker 41 and receiver aircraft 56 is also possible.

Figure 6:
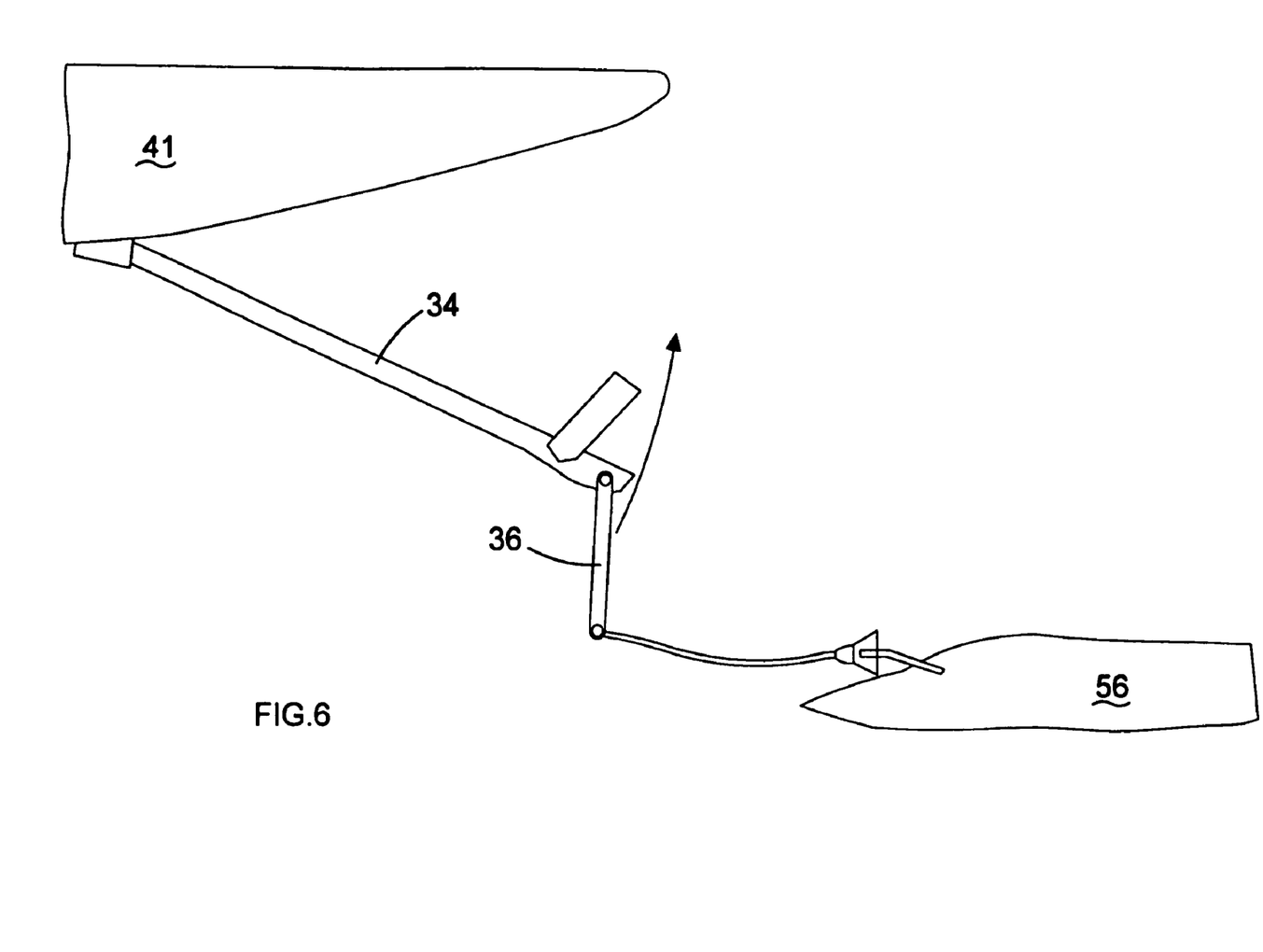
FIG. 6 is a schematic side view of the boom drogue adaptor of FIG. 3 showing the configuration during hose and drogue refuelling.
Figure 13:
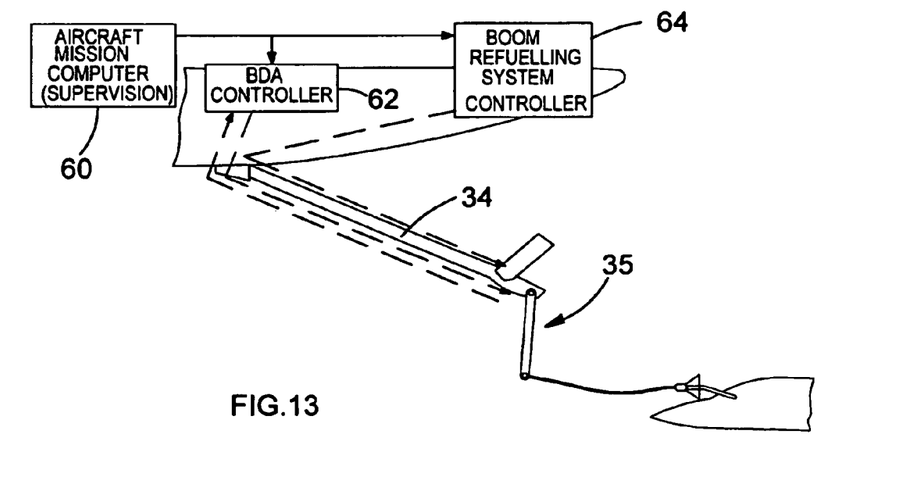

Under the control of the adaptor controller 62, torque is applied by the motor 58 to bring the hose and drogue forward against the aerodynamic drag force, for example until it is about 25° from the vertical. The torque is sufficient to rotate the arm forwardly to this point, and with any further forward movement of the arm, the torque is reduced to a lower value sufficient to keeps the hose under tension with a receiver engaged. As the receiver makes contact, the load on the drogue is reduced, and the controller 62 keeps the torque at a level which keeps the hose under sufficient tension to prevent whipping under air loads.

Figure 7:
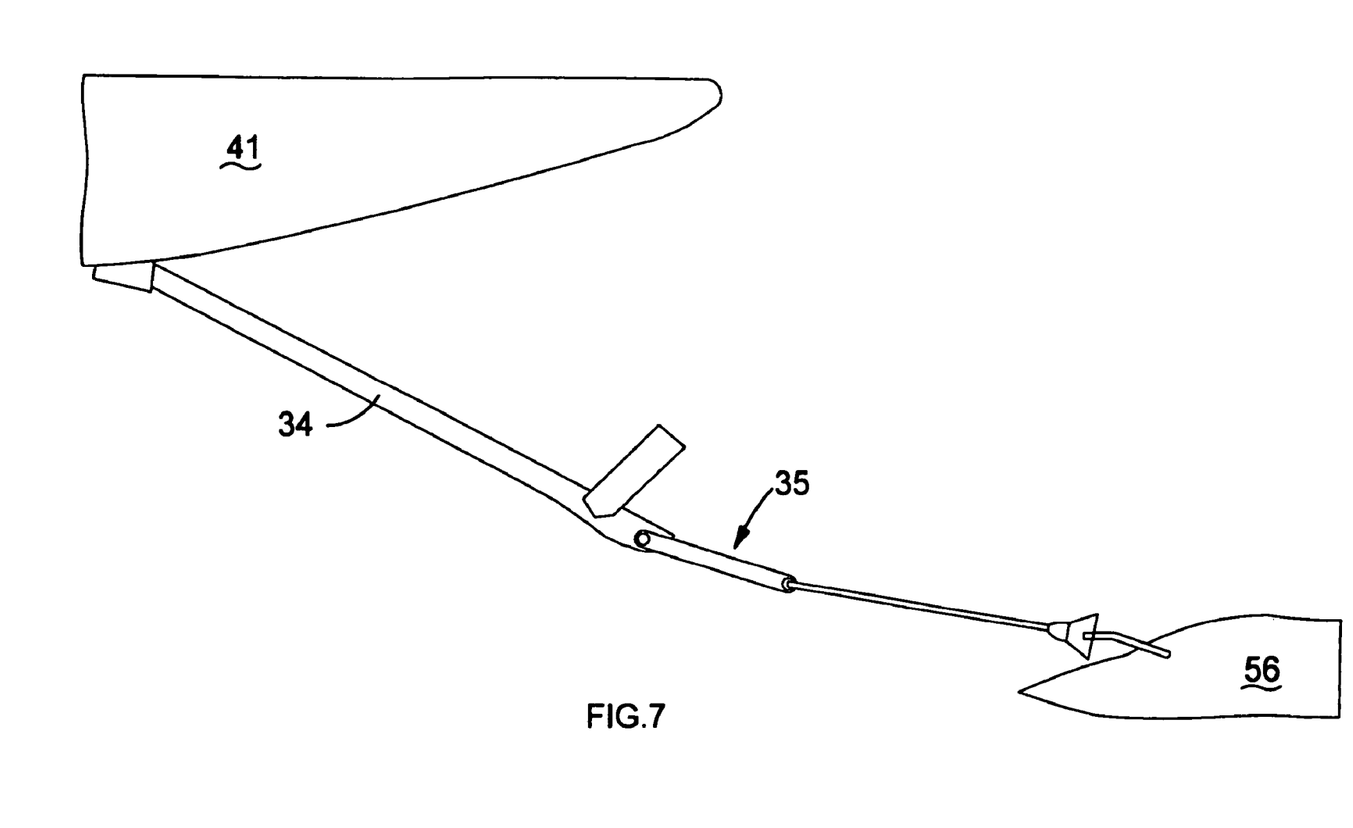
FIG. 7 is a further schematic side view of the adaptor of FIG. 6.

As shown in FIG. 7, as the receiver pulls back such that the arm exceeds 25° to the vertical in the trail direction, with the torque in the actuator maintained, the tension is increased sufficiently to cause the receiver to unlatch from the reception coupling and separate. If the receiver fails to separate, then the boom, arm and hose will stream under the tension from the reception coupling until the coupling separates from the receiver as a result of the high tension. Thus the arm 36 can effectively take up loads in the rearward direction such that they need not be resisted as torque in the system.

The invention claimed is:
1. An adaptor for mounting a refuelling hose and drogue arrangement to a refuelling boom of an aircraft so as to allow selective refuelling by the refuelling boom and the refuelling hose and drogue assembly, the adaptor being arranged to provide fluid communication between the boom and a hose of the hose and drogue arrangement whilst allowing the boom to act also as a refuelling boom independently of the hose and drogue arrangement and being arranged such that the hose is movable with respect to the boom between a position which is suitable for refuelling using the hose and a position which is suitable for refuelling using the boom without using the hose and drogue arrangement, the adaptor comprising:

an actuator arranged to produce a biasing force on the hose, and arranged for affecting movement to adjust the position of the hose in relation to the boom; and     an arm pivotally mounted, at or adjacent one end of the arm, to a distal end of the boom.

2. An adaptor as claimed in claim 1, in which the biasing force on the hose is arranged to be in a direction to counter the aerodynamic force on the hose and drogue arrangement in flight.

3. An adaptor as claimed in claim 1, in which the actuator is operable to vary the biasing force.

4. An adaptor as claimed in claim 1, which is arranged to be attached to the boom at or adjacent a distal end thereof.

5. An adaptor as claimed in claim 1, comprising a movable arm having a fuel channel.

6. An adaptor as claimed in claim 5, in which the arm is pivotally mounted, at or adjacent one end of the arm, to the boom.

7. An adaptor as claimed in claim 6, in which the arm is pivotally mounted, at or adjacent another end of the arm, to the hose.

8. An adaptor as claimed in claim 6, in which the biasing force is torque applied at the pivotal mount.

9. An adaptor as claimed in claim 8, in which the actuator comprises a motor for applying torque at the pivotal mounting between the arm and the boom, to move the arm about a pivot of the pivotal mounting.

10. An adaptor as claimed in claim 9, in which the actuator is operable to apply torque in either direction.

11. An adaptor as claimed in claim 1, in which the actuator is arranged to retract the hose to take up any slack in the hose when a receiver aircraft makes contact with the drogue.

12. A refuelling apparatus for an aircraft, the apparatus comprising a refuelling boom and an adaptor for mounting a refuelling hose and drogue arrangement to the refuelling boom so as to allow selective refuelling by the refuelling boom and the refuelling hose and drogue assembly, the adaptor being arranged to provide fluid communication between the boom and a hose of the hose and drogue arrangement whilst allowing the boom to also act as a refuelling boom independently of the hose and drogue arrangement and being arranged such that the hose is movable with respect to the boom between a position which is suitable for refuelling using the hose and a position which is suitable for refuelling using the boom without using the hose and drogue arrangement, the adaptor comprising:

an actuator arranged to produce a biasing force on the hose, and arranged for affecting movement to adjust the position of the hose in relation to the boom; and     an arm pivotally mounted, at or adjacent one end of the arm, to a distal end of the boom.

13. A refuelling apparatus as claimed in claim 12, comprising a control system arranged to control the actuator.

14. A refuelling apparatus as claimed in claim 12, in which the actuator is arranged to retract the hose to take up any slack in the hose when a receiver aircraft makes contact with the drogue.

15. A refuelling apparatus as claimed in claim 12, in which the adaptor comprises a moveable arm having a fuel channel, the arm being pivotally mounted, at or adjacent one end of the arm, to the boom and the arm being pivotally mounted, at or adjacent another end of the arm, to the hose, wherein the adaptor is arranged to:

i) move the arm to a first position, below the level of the boom, ready for refuelling using the hose and drogue arrangement;

ii) move the arm forward from the first position to a second position to retract the hose to take up any slack in the hose when a receiver aircraft makes contact with the drogue;

iii) move the arm to a third position, above the level of the boom, for at least one of takeoff and landing; and     iv) move the arm to a fourth position for normal flight whilst not refuelling using the hose and drogue arrangement.

16. An adaptor for mounting a refuelling hose and drogue arrangement to a refuelling boom of an aircraft so as to allow selective refuelling by the refuelling boom and the refuelling hose and drogue arrangement, the adaptor being arranged to provide fluid communication between the boom and a hose of the hose and drogue arrangement and being arranged such that the hose is movable with respect to the boom between a position which is suitable for refuelling using the hose and a position which is suitable for refuelling using the boom without using the hose and drogue arrangement, the adaptor comprising:

an actuator arranged to produce a biasing force on the hose, and arranged for affecting movement to adjust the position of the hose in relation to the boom; and     an arm pivotally mounted, at or adjacent one end of the arm, to a distal end of the boom.

17. A refuelling apparatus for an aircraft, the apparatus comprising a refuelling boom and an adaptor for mounting a refuelling hose and drogue arrangement to the refuelling boom so as to allow selective refuelling by the refuelling boom and the refuelling hose and drogue arrangement, the adaptor being arranged to provide fluid communication between the boom and a hose of the hose and drogue arrangement and being arranged such that the hose is movable with respect to the boom between a position which is suitable for refuelling using the hose and a position which is suitable for refuelling using the boom without using the hose and drogue arrangement, the adaptor comprising:

an actuator arranged to produce a biasing force on the hose, and arranged for affecting movement to adjust the position of the hose in relation to the boom; and     an arm pivotally mounted, at or adjacent one end of the arm, to a distal end of the boom.

* * * * *